United States Patent [19]
Lauth et al.

[11] Patent Number: 6,149,416
[45] Date of Patent: Nov. 21, 2000

[54] HYDRAULIC MACHINE

[75] Inventors: Hans-Juergen Lauth, Neu Anspach; Willi Parsch, Bickenbach, both of Germany

[73] Assignee: Luk Fahrzeug-Hydraulik GmbH & Co., KG, Germany

[21] Appl. No.: 09/041,229

[22] Filed: Mar. 12, 1998

[30] Foreign Application Priority Data

Mar. 12, 1997 [DE] Germany .......................... 197 10 122

[51] Int. Cl.[7] .................................................. F01C 19/08
[52] U.S. Cl. ........................................... 418/182; 418/133
[58] Field of Search ..................................... 418/182, 133

[56] References Cited

U.S. PATENT DOCUMENTS

| | | | |
|---|---|---|---|
| 4,470,768 | 9/1984 | Konz | 417/310 |
| 4,573,890 | 3/1986 | Hadama et al. | 418/408 |
| 4,575,314 | 3/1986 | Teubler et al. | 417/310 |
| 4,770,612 | 9/1988 | Teubler | 417/300 |

FOREIGN PATENT DOCUMENTS 3439311  5/1986  Germany .

*Primary Examiner*—Thomas Denion
*Assistant Examiner*—Theresa Trieu
*Attorney, Agent, or Firm*—Ostrolenk, Faber, Gerb & Soffen, LLP

[57] ABSTRACT

A hydraulic machine is proposed, with a drive shaft rotating around a center axis, a drive wheel at a first end of the drive shaft, via which forces, which are characterized by a force component running largely vertical to the center axis, are led to the drive shaft, a second, opposite end of the drive shaft with a pump unit, which is characterized by a first rotating pump element connected to the drive shaft and a fixed pump element which works in conjunction with the first pump element, and with a bearing unit for the drive shaft, the hydraulic machine is characterized by the fact that the bearing unit (33) is offset to the line drawn by the middle axis (13) when the drive shaft (27) is not under load, where the bearing unit (33) is positioned in the direction of the force components relative to the center axis (13).

9 Claims, 2 Drawing Sheets

HYDRAULIC MACHINE

BACKGROUND OF THE INVENTION

The invention concerns a hydraulic machine, in particular a steering aid pump and particularly relates to the positioning of the drive shaft and elements on the shaft.

Hydraulic machines of the type described here are well-known. They are characterised by a drive shaft, to the first end of which is attached a drive wheel, also described as a swash plate, via which a torque is introduced to the drive shaft by means of a specially designed belt. This serves to drive a pump unit which is located at the other end of the drive shaft and which is comprised of a first rotating (pump) element driven by the drive shaft and a second fixed (pump) element. This works in conjunction with the first (pump) element. There is a bearing unit between the two ends of the drive shaft.

Above the drive wheel is a belt, the tensile force of which is characterised by a force element which is directed radially to the center axis of the drive shaft and which bend the shaft and move them from their initial position. In hydraulic machines and steering aid pumps of the type described here, belt tensile forces are effective in such a way that there is a tangible deflection of the end of the shaft attached to the drive wheel, and thus of the drive shaft. The opposite end of the shaft, which is attached to the first, rotating (pump) element is deflected in the opposite direction, because of the bearing unit between the two ends of the shaft. Thus the first, rotating (pump) element is positioned inside the second, fixed (pump) element, which leads to increasing vibration, and therefore to persistent noises, but also leads to increased wear. The noises can be caused by the vibration, and by the fact that the two (pump) elements come into direct contact with one another when the machine is running.

A pump is known from German publication DE 34 39 311 A1, in which the middle section between the rotating and the fixed pump element, which is brought forward by the belt tension on the shaft, is balanced out by the fact that the fixed pump element, which is also called the lifting ring, shifts position. This means that the positioning of the rotating pump element can be adjusted to compensate in relation to the lifting ring. However the rotating pump element, also called the rotor, takes up a position adjusted in relation to the pressure plate. This means that noises are generated when the pump is operating, as the control or pressure ducts found in the pressure plate or the lid overscore the joints in the pump either too early or too late. This disrupts the 'timing' of the pump. Furthermore, there is the disadvantage that when the lifting ring shifts, the hydraulic connections running with it are also shifted, so that they are no longer flush with the control or pressure ducts. This means that there are edges, which cause a significant amount of noise when the pump is operating.

SUMMARY OF THE INVENTION

Therefore the object of the invention is to create a hydraulic machine of the type described, which is not characterised by these disadvantages.

To resolve these problems, a hydraulic machine of one embodiment has is proposed which is characterised by the features named in Claim 1. The hydraulic machine is characterised by movement of the drive shaft, which is caused by the belt tensile forces, is compensated by the fact that the bearing unit is also shifted in position. The bearing unit shifts in the direction of the force components, which are basically vertical or radial to the centre axis of the drive shaft and pass through the drive wheel to the drive shaft. The bearing unit is shifted while the hydraulic machine is not under load. If the hydraulic machine is impacted with the forces resulting from the belt tensile forces when ready for operation, the drive shaft shifts, and in such a way that the centre axis of the drive shaft now runs in its optimum desired position in relation to the pump. Thus the centre of the first pump element, which is linked to the second end of the shaft, is exactly in the right position within the second, fixed pump element, reducing the vibration and/or the noise level, and the wear. As the first pump is positioned exactly in relation to the second pump element, this second pump element is also in the correct position in relation to the pressure plate containing the control or pressure ducts, this means that the timing of the pump is optimised. The control or pressure ducts located in the pressure plate or in a lid can then be properly "switched on" or "off" relative to the rotation position of the first pump element. This also reduces the vibration and/or noise level when the pump is operating.

In the preferred version of the invention, the bearing unit will be offset by between 0.05 mm and 0.15 mm, preferably by 0.1 mm from the centre axis.

The problem is also resolved with a second embodiment of hydraulic machine which is characterised by the fact that, together with its two side plates, the second pump element is offset from the course of the middle axis of the drive shaft when it its not under load, which means that the second pump element and the two side plates are positioned opposite the direction of the force elements relative to the centre axis. If, while it is running, the hydraulic machine is now impacted with the forces resulting from the belt tensile forces, the drive shaft and rotor shift. As the second pump element and the two side plates, which are also referred to as pressure plates, are positioned off the centre axis of the drive shaft, the force impacting on the drive shaft means that the first pump element or rotor also shifts, so that it takes up the optimum position relative to the lifting ring and the two pressure plates. Therefore the first pump element, which is also called the rotor, is in the correct position relative to the control or pressure ducts in the pressure plates, meaning that the timing of the pump is optimised. This means that the pressure ducts are properly "switched on" or "off", by means of the rotation of the rotor. This also reduces the vibration and/or noise level when the pump is operating.

Other features and advantages of the present invention will become apparent from the following description of the invention which refers to the accompanying drawings.

BRIEF DESCRIPTION OF THE DRAWINGS

The following is a more detailed description of the invention, with the aid of the following diagrams.

DETAILED DESCRIPTION OF THE INVENTION

The invention generally concerns a hydraulic machine, i.e. a hydraulic motor and a unit to pump material, particularly hydraulic oil, which particularly serves to supply additional units in motor vehicles, for example the steering.

If the hydraulic machine is used as a motor, a medium, for example hydraulic oil, is introduced into the "pump unit" at high pressure, so that one "pump element" can start rotating relative to the other. This introduces torque into the drive shaft, which can then be picked up by means of a drive wheel. A belt, at a certain tension, can then be passed around the drive wheel. This leads to an angle error on the drive shaft, with the result that the elements of the "pump unit", which is acting as a motor here, are shifted from their ideal position, which leads to an increased level of vibration and/or noise, and increased wear.

In the following it is assumed that the hydraulic machine has a unit to pump a medium which will be driven, for example, by the engine of a motor vehicle. It can also be what is known as a steering aid pump, which serves to pump hydraulic oil to supply a power steering unit, which reduces the steering force of the vehicle. Normally steering aid pumps take the form of wing cell pumps. However the design of the pump unit is not decisive. Depending on the application, it can also be, for example, a radial piston pump, a roll cell pump or a block wing pump.

Figure 1:
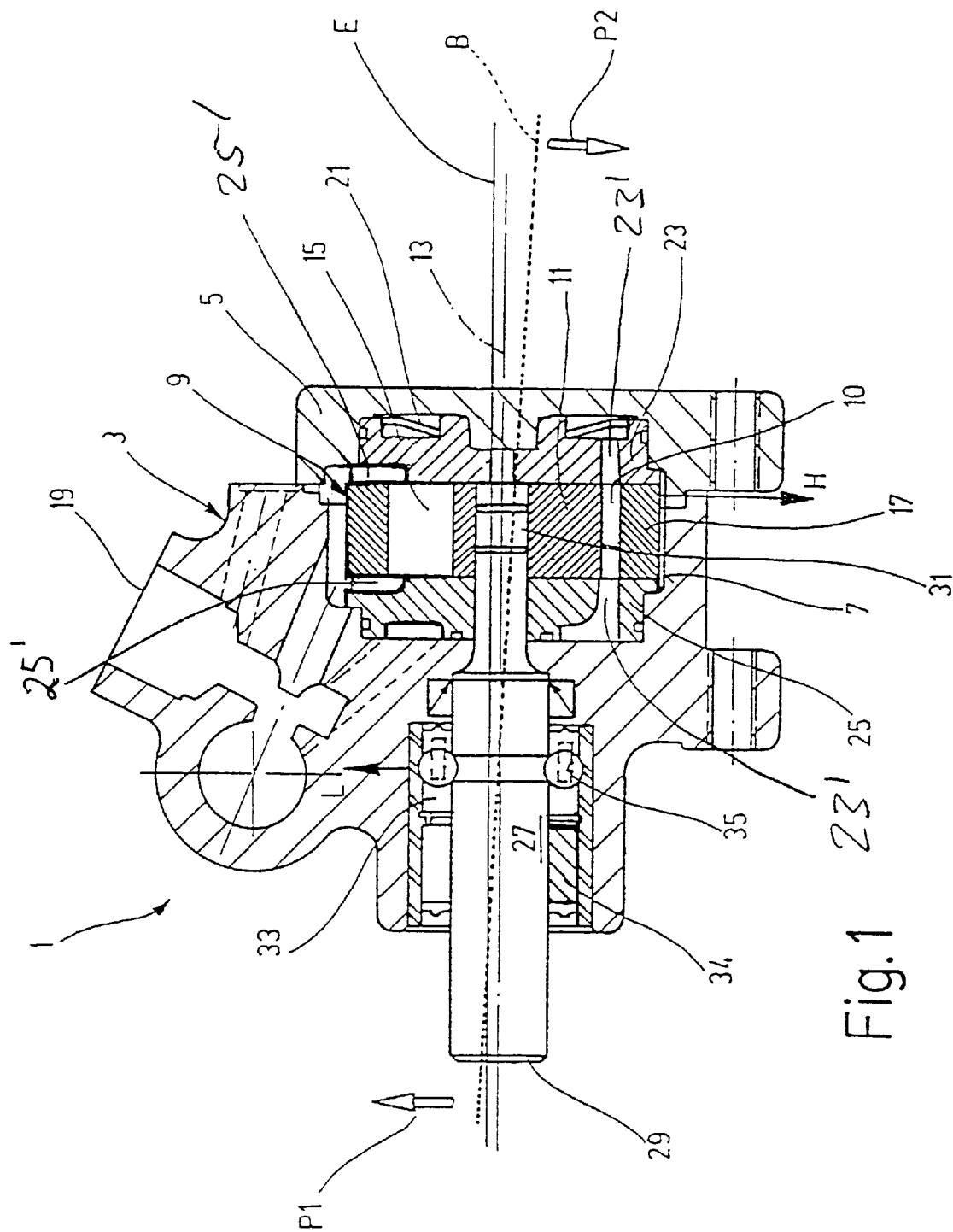
FIG. 1 shows a longitudinal section of a hydraulic machine.

The longitudinal section represented in FIG. 1 shows a steering aid pump, the function and construction of which are largely known. Therefore details are only given on the relevant components.

The pump 1 has a housing 3, which is sealed by a lid 5 and which surrounds an internal chamber 7, in which is located a hydraulic unit, which can also, in principle, act as a motor, and which, in the following, will be described as the pump unit 9. This includes a rotor 11, in which are located slits that run radially to a center axis 13. In these slits are radially adjustable vans, blades or wings 15. The external edges of the wings 15 come into contact with the inner surface of a lifting ring 17 or cam surface, which contains a pump chamber 10, which is largely elliptical. When the rotor 11, which is a first rotating pump element, rotates, the vanes or wings 15 on the inner surface of the lifting ring 17 or cam, which form a second, fixed pump element, follow. Between vans or wings there are pump chambers, which become larger and smaller, so that a medium, for example hydraulic oil, is pumped from a tank connection 19 to a pressurised chamber. In order to seal off the pump chambers between the wings 15 at the laternal sides, there is both what is referred to as a wear plate 25 and a pressure plate, which rest on the lateral surfaces of the lifting ring 17, the rotor 11 and the wings 15, and form a seal. In the wear plate 25, which is also described as the pressure plate, are pressure ducts 23' and suction ducts 25', which are already known. The pressure ducts 23' on the wear plate and pressure plates 25 and 23, which are also referred to as side plates, are connected to the pressurised chamber 21, so that the medium can be pumped from the pump chamber to the pressurised chamber 21. The suction ducts 25' on the two side plates 23 and 25 are linked to the tank connection, so that the medium can be sucked into the pump chambers, which are increasing in size. As mentioned above, if the pressure chamber is decreasing in size, the medium moves into the pressurised chamber 21 through the pressure ducts 23'.

The rotor 11 meshes with a drive shaft 27. The first end of the shaft 27, opposite to the rotor 11, projects out of the housing 3 and is connected so that it cannot relatively rotate to a drive wheel, also called a swash plate, which is not represented here. The second end 31, which lies inside the rotor 11, can be connected to the rotor 11, so that torque can be introduced to the rotor 11 via the drive shaft 27, or (for motors) vice versa.

There is a bearing unit between the two ends 29 and 31 of the drive shaft. This can contain a series of wheels 34 or ball-bearings 35. Any form of bearing unit 33 can be selected. Instead of the anti-friction bearing depicted here, slide bearings could also be used.

Figure 2:
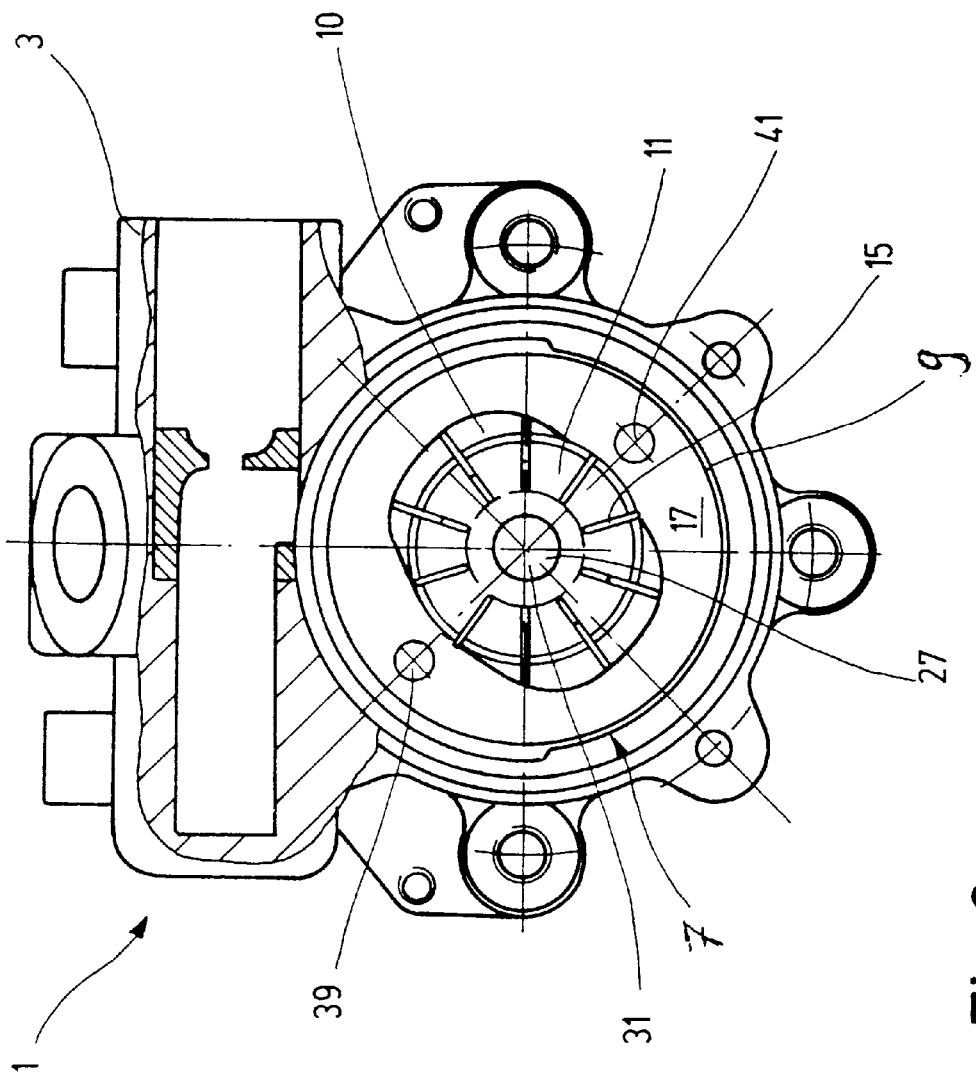
FIG. 2 shows a cross-section of the hydraulic machine represented in FIG. 1.

FIG. 2 shows a cross-section of the pump 1. Parts which are the same are given the same reference numbers, so that the description of FIG. 1 can also be referred to. The cross-section is taken through the pump 1 so that the internal chamber inside the pump unit 9 is clearly recognizable. It includes the rotor 11, and the second pump element, i.e. the lifting ring or cam 17, which is fixed inside the housing 3. The pump chamber 10, which is more or less elliptical, which houses the rotor 11 and through which the wings or vanes 15 run, is also clearly visible.

The lifting ring 17 is attached to the side plates 23 and 25 of the pump 1 using two pins 39 and 41. These hold and centralise the lifting ring 17 relative to the side plates 23 and 25. At the same time the side plates 23 and 25 are centralised and secured by their perimeter in the housing 3 or in the lid 5. The length of the pins 39 and 41 should preferably be measured so that they pass through both the lifting ring 17 and the side plates 23 and 25. However, it is also possible to secure each side plate 23 or 25 to the lifting ring with two pins, so that a total of four pins are used.

FIG. 2 also shows the second end of the drive shaft on the inside of the rotor 11.

It can be seen from FIG. 2 that the rotor 11 should ideally be positioned centrally inside the lifting ring.

In the longitudinal section represented in FIG. 1, the ideal position of the centre axis 13 is shown as a dotted line. It runs horizontally through the pump 1, or through its housing 3 and represents the turning axis for the drive shaft 27 and the rotor 11. It also coincides with the centre axis of the bearing unit 13.

When the pump is operating, a drive moment is introduced to the drive shaft 27 via the drive wheel, which is not represented here, but is located at the first end 29 of the drive shaft 27. This drive moment serves to make the rotor rotate. The drive wheel is driven by a belt, that passes round the drive wheel at tension. A force component of 900 N to 2600 N is introduced to the drive shaft 27 via the belt, this force component is largely vertical or radial to the turning axis 13. In FIG. 1 it is assumed that this force component is effective vertically upwards. This is indicated by a double arrow P1.

This force element introduces a clockwise tipping moment to the drive shaft 27. Without particular precautions, the drive shaft 27, as represented by the dotted line B, would be deflected up and, its second end 31 on the right—indicated with a double arrow—would be deflected downwards when put under load. The rotating point of the movement would be in the bearing unit 33, which supports the central area of the drive shaft. This tipping movement deflects the first rotating pump element, the rotor 11, which is linked to the second, right-hand end 31 of the drive shaft, downwards, so that it is moved out of position relative to the second, fixed, pump element, the lifting ring 17, the wear plate 25 and the pressure plate 23. This would lead to a high noise level and increased wear when pump 1 is operating.

In FIG. 1, the single arrows L and H indicate how the movement of the drive shaft 27 when under load can be avoided:

The bearing unit 33 can, as indicated by arrow L, be moved upwards relative to the ideal centre line 13, i.e. in the direction of the force components applied through the belt as, represented by the double arrow P1. This means that the drive shaft 27 and its second, right-hand end 31 are also moved upwards. Thus the centre axis 13 of the pump 1 shifts upwards in parallel, bringing it into position E, which is indicated by a line representing the pump in its unloaded state. Therefore position E of the drive shaft is only reached when the bearing unit is offset in the housing 3 and no forces are introduced to the drive shaft 27 via a belt and a drive wheel.

When the pump is operating and forces are introduced to the drive shaft via a drive belt, including force components pointing upwards, as indicated by the left double arrow P1, the drive shaft 27 then shifts clockwise and thus out of the unloaded position indicated by line E. Its second, right-hand end 31 then reaches its ideal position, which is indicated by the centre line 13. As the bearing unit 33 can be adjusted relative to the ideal central line, the centre of the rotor 11 is in its ideal position relative to the lifting ring 17 and the pressure plates 23 and 25, and therefore in its ideal position relative to the suction or pressure ducts 25' or 23'. This means that the timing of the pump is not disturbed. It also means that the suction and pressure ducts 25' and 23' can be switched on and off properly when they are passed over by the wings, at the same time and relative to the rotational position of the rotor 11.

It is also possible, but more difficult from a production point of view, to position the lifting ring 17, which is fixed in the pump housing, together with the wear plate 25 and the pressure plate 23 so that they are not positioned ideally, symmetrical to the turning axis 13, but instead moved in the direction of the arrow H, i.e. in the opposite direction to that of the force components of the drive belt, indicated by the left hand double arrow P1, or in the direction of the double arrow P2. In order to reposition the lifting ring 17 and the side plates 23 and 25, the hollow in housing 3 and/or in lid 5 must be offset or repositioned relative to hollow in which the bearing unit 33 fits. If, as a result of this force component, the second, right-hand end 31 moves downwards, as indicated by the double arrow P2, so that the drive shaft 27 is in position B, indicated by a dotted line, then the rotor 11 is in its ideal position relative to the lifting ring 17, the wear plate 25 and the pressure plate 23. This adjustment in the direction of the arrow H should anticipated the swinging motion of the drive shaft 27 under load, so that, when the pump 1 is running and under load, the pump elements 11 and 17, together with the side plates 23 and 25 are arranged ideally relative to one another, reducing vibration, noise development and wear to a minimum.

It becomes clear from the above that both measures could also be combined. Therefore it is possible to move the bearing unit 33 in the direction of arrow L, upwards relative to the ideal centre axis 13, while at the same time mounting the lifting ring which is fixed into the housing 3 together with the side plates 23 and 25 so that it is positioned lower down in the direction of the arrow H. As the effects of repositioning the bearing unit 33 and adjusting the positioning of the lifting ring 17 are cumulative, the positioning of the bearing unit and/or the lifting ring can be adjusted less relative to the wear plate 25 and the pressure plate 23.

If the load on the drive shaft 27 causes it to swing out of position when the pump 1 is mounted, this is then compensated by the repositioning of the bearing unit 33 and/or the lifting ring 17 or the wear plate 25 and the pressure plate 23, so that the rotor is in its optimum position inside the lifting ring, reducing vibrations, noise and wear to a minimum. As the wear plate 25 and the pressure plate 23 are adjustable together with the lifting ring 17, the rotor 11 and/or the wings 15 can be positioned ideally relative to the suction and pressure ducts 25' and 23', optimising the timing of the pump and reducing pressure vibrations and/or noise still further.

The above serves to prove that the pump 1 constructed in an altered way relative to current technology, is very simple to construct. The pump is essentially constructed in the same way, the only alterations necessary are altering the positioning of the hollow in which the bearing unit 33 fits or adjusting the mounting of the lifting ring 17 and the pressure and wear plates 23 and 25, so that the lifting ring is secured to the pressure plate 23 with the pins 39 and 41. The mounting of the lifting ring 17, and the wear and pressure plates 25 and 23 can be adjusted by offsetting the inner chamber 7 in the housing 3 relative to the hollow in which the bearing unit fits. The hollow in the lid 5, in which the pressure plate 23 fits, can also be offset at the same time.

It has emerged that, for steering aid pumps of the type represented here, where there is a certain force component, adjusting the bearing unit 33 by between 0.05 mm and 0.15 mm, ideally by 0.1 mm, in the direction of the arrow L can lead to a significant reduction in vibration, noise and wear levels. The adjustment of the lifting ring 17 in the direction of the arrow H can be secured accordingly, together with the wear plate 25 and the pressure plate 23. The direction of the arrow H is dependent on the length of the drive shaft 27, on the curve it draws when under load, on its elasticity and on the design of the bearing unit 33 and its bearing play. If this is made up of, for example, two adjacent slide bearings, and support a relatively long section of the drive shaft 27, the drive shaft 27 moves less under load, so that a relatively small adjustment of the lifting ring 17, the wear plate 25 and the pressure plate 23 in the direction of the arrow H is sufficient to reduce the vibration and/or noise levels and the level of wear.

The above serves to prove that the basic principle described here, that of compensating in advance for any movement in position of the drive shaft of a steering aid pump by external force elements, can be transferred to various pump types and also to hydraulic machines which are impacted with a material under pressure, for example, hydraulic oil, so that a rotating part within a part fixed inside the housing of the hydraulic machine is set in motion and drive forces are transferred to a drive shaft. These forces are then picked up by a drive wheel which is located at the opposite end of the drive shaft and which works in conjunction with a drive belt.

The solution described here avoids complicated, expensive bearing units which are characterised by low levels of bearing tolerance. The tolerances of the pump and the drive shaft can also be kept significantly higher, reducing production costs. Preferably the bearing unit 33 should be adjusted. This is particularly simple and cheap for a steering aid pump, as only the hollow in which the bearing unit 33 fits needs to be offset in the housing 3. This offset arrangement of the hollow does not result in tolerance problems, as only one value has to be altered here. Therefore there are no cumulative tolerance errors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hydraulic machine comprising
   a pump chamber having a periphery with an inlet at one position around the periphery and an outlet at another position around the periphery;
   a lifting ring cam extending around and defining the periphery of the pump chamber, the pump chamber having lateral sides and side plates cooperating with the lifting ring cam for enclosing the pump chamber;

a rotor in the pump chamber, the rotor having a rotary axis about which the rotor rotates in the pump chamber;

wings or blades supported in the rotor extending radially outwardly from the rotor and in rubbing engagement with the lifting ring cam and staying in engagement with the lifting ring cam as the rotor rotates in the pump chamber;

a pump drive shaft, the rotor being supported on the drive shaft; a bearing supporting the pump drive shaft in the housing and the bearing being outside the pump chamber; the axis of the drive shaft having a first untilted orientation with reference to the bearing when force is not applied to one radial side of the shaft and having a second tilted orientation when force is applied to the one radial side of the shaft to drive the shaft to rotate; the shaft being drivable by application of rotary force to the one radial side of the shaft at a location at one axial side of the shaft past the bearing and away from the rotor, such that force applied to the one radial side of the shaft at the one axial side of the shaft to drive the shaft to rotate tends to tilt the shaft in the bearing such that the one axial side of the shaft to which the force is applied moves in the direction of the force and the other axial side of the shaft at the opposite side of the bearing moves in the opposite direction;

at least one of a first and second tilt compensation for the shaft, wherein;

the first tilt compensation comprises the bearing being offset in the housing in the direction toward which the one axial side of the shaft is moved when force is applied to the one radial side of the shaft and the second tilt compensation comprises the lifting ring cam and the side plates being offset, relative to the axis of the shaft when force is not applied to the one radial side of the shaft, and toward the direction in which the shaft is tilted in the pump chamber when force is applied to the one radial side of the shaft at the first axial side of the shaft, so that the rotor in the pump chamber and the lifting ring cam and the side plates will have an orientation accommodating the tilting of the shaft when force is applied to the one radial side of the shaft.

2. The hydraulic machine of claim 1, wherein the lifting ring cam is non-circular in shape and the pump chamber has different radial height sections with the inlet and outlet communicating into respective ones of the different height sections.

3. A hydraulic machine comprising a housing, a drive shaft in the housing rotating around a center axis with a normal first orientation;

a bearing in the housing supporting the shaft for rotation in the housing, the shaft having a first axial side at one axial side of the bearing and force is applied to the first axial side of the shaft at one radial side of the shaft for rotating the shaft and the force applied to the one radial side of the shaft at the first axial side of the shaft tends to tilt the shaft from a first axial orientation to a second tilted axial orientation;

a pump unit in the housing connected to the shaft at a second axial side of the shaft at the opposite axial side of the bearing away from the first axial side of the shaft, wherein the second axial side of the shaft is tilted in the opposite direction from the first axial side of the shaft by the radial force applied to the one radial side of the shaft at the first axial side thereof;

a rotor pump element connected on the second axial side of the shaft; a fixed pump element in the housing, and the rotor pump element rotating within the fixed pump element; an inlet into and the inlet and an outlet from the fixed pump element and the inlet and the outlet being spaced apart so that the rotation of the rotor pump element in the fixed pump element pumps liquid from the pump inlet to the pump outlet;

the bearing being offset in the housing in the direction toward which the shaft is tilted when force is applied to the one radial side of the shaft at the first axial side of the shaft, relative to the normal axial orientation of the shaft without force applied to the one radial side.

4. The hydraulic machine of claim 2, wherein the bearing is offset in the range between 0.05 mm and 0.15 mm.

5. The hydraulic machine of claim 2, wherein the bearing is offset by 0.1 mm.

6. A hydraulic machine comprising a pump chamber having a periphery with an inlet at one position around the periphery and an outlet at another position around the periphery;

a lifting ring cam extending around and defining the periphery of the pump chamber, the pump chamber having lateral sides and side plates cooperating with the lifting ring for enclosing the pump chamber;

a rotor in the pump chamber, the rotor having a rotary axis about which the rotor rotates in the pump chamber;

wings or blades supported in the rotor extending radially outwardly from the rotor and in rubbing engagement with the lifting ring cam and staying in engagement with the lifting ring cam as the rotor rotates in the pump chamber;

a pump drive shaft, the rotor being supported on the drive shaft; a bearing supporting the pump drive shaft in the housing and the bearing being outside the pump chamber; the axis of the drive shaft having a first untilted orientation with reference to the bearing when force is not applied to one radial side of the shaft and having a second tilted orientation when force is applied to the one radial side of the shaft to drive the shaft to rotate; the shaft being drivable by application of rotary force to the one radial side of the shaft at a location at a first axial side of the shaft past the bearing and away from the rotor, such that force applied to the one radial side of the shaft at the first axial side of the shaft to drive the shaft to rotate tends to tilt the shaft in the bearing from a first axial orientation to a second tilted axial orientation such that the first axial side of the shaft to which the force is applied moves in the direction of the force and the other axial side of the shaft at the opposite side of the bearing moves in the opposite direction;

the bearing being offset in the housing in the direction toward which the first axial side of the shaft is moved when force is applied to the one radial side of the shaft at the first axial side of the shaft, relative to the normal axial orientation of the shaft without force applied to the one radial side.

7. The hydraulic machine of claim 6, wherein the lifting ring cam is non-circular in shape and the pump chamber has different radial height sections with the inlet and outlet communicating into respective ones of the different height sections.

8. A hydraulic machine comprising a pump chamber having a periphery with an inlet at one position around the periphery, an outlet at another position around the periphery, lateral sides and first and second side plates;

a lifting ring cam extending around and defining the periphery of the pump chamber, the lateral sides and the first and second side plates of the pump chamber cooperating with the lifting ring cam to enclose the pump chamber;

a rotor in the pump chamber, the rotor having a rotary axis about which the rotor rotates in the pump chamber;

wings or blades supported in the rotor extending radially outwardly from the rotor and in rubbing engagement with the lifting ring cam and staying in engagement with the lifting ring cam as the rotor rotates in the pump chamber;

a pump drive shaft, the rotor being supported on the drive shaft; a bearing supporting the pump drive shaft in the housing and the bearing being outside the pump chamber; the axis of the drive shaft having a first untilted orientation with reference to the bearing when force is not applied to one radial side of the shaft and having a second tilted orientation when force is applied to the one radial side of the shaft to drive the shaft to rotate; the shaft being drivable by application of rotary force to the one radial side of the shaft at a location at a first axial side of the shaft past the bearing and away from the rotor, such that force applied to the one radial side of the shaft at the first axial side of the shaft to drive the shaft to rotate tends to tilt the shaft in the bearing such that the first axial side of the shaft to which the force is applied moves in the direction of the force and the other axial side of the shaft at the opposite side of the bearing moves in the opposite direction;

the lifting ring cam and the first and second side plates being offset, relative to the axis of the shaft when force is not applied to the one radial side of the shaft, and toward the direction in which the shaft is tilted in the pump chamber when force is applied to the one side of the shaft at the first axial side of the shaft, so that the rotor in the pump chamber and the lifting ring cam and the side plates will have an orientation accommodating the tilting of the shaft when force is applied to the one radial side of the shaft, thereby providing tilt compensation for the shaft.

9. The hydraulic machine of claim 8, wherein the lifting ring cam is non-circular in shape and the pump chamber has different radial height sections with the inlet and outlet communicating into respective ones of the different height sections.

* * * * *